(12) United States Patent
Cho et al.

(10) Patent No.: US 11,875,526 B1
(45) Date of Patent: Jan. 16, 2024

(54) METHOD FOR TRAINING OBJECT DETECTOR CAPABLE OF PREDICTING CENTER OF MASS OF OBJECT PROJECTED ONTO GROUND, METHOD FOR RECOGNIZING IDENTICAL OBJECT IN SPECIFIC SPACE CAPTURED FROM A PLURALITY OF CAMERAS HAVING DIFFERENT VIEWING FRUSTUMS USING TRAINED OBJECT DETECTOR, AND LEARNING DEVICE AND OBJECT RECOGNIZING DEVICE USING THE SAME

(71) Applicant: Deeping Source Inc., Seoul (KR)

(72) Inventors: Minyong Cho, Seoul (KR); Federica Spinola, Seoul (KR)

(73) Assignee: Deeping Source Inc., Seoul (KR)

( * ) Notice: Subject to any disclaimer, the term of this patent is extended or adjusted under 35 U.S.C. 154(b) by 0 days.

(21) Appl. No.: 18/241,631

(22) Filed: Sep. 1, 2023

(30) Foreign Application Priority Data

Jul. 11, 2023 (KR) .......................... 10-2023-0089492

(51) Int. Cl.
*G06T 7/70* (2017.01)
*G06V 10/25* (2022.01)
(Continued)

(52) U.S. Cl.
CPC ................ *G06T 7/70* (2017.01); *G06V 10/25* (2022.01); *G06V 10/762* (2022.01);
(Continued)

(58) Field of Classification Search
CPC . G06T 7/70; G06T 2207/20081; G06V 10/25; G06V 10/762; G06V 10/764; G06V 2201/07
See application file for complete search history.

(56) References Cited

U.S. PATENT DOCUMENTS

| 2018/0012082 A1* | 1/2018 | Satazoda .............. G06V 10/763 |
| 2019/0209116 A1* | 7/2019 | Sjöstrand .............. G16H 50/30 |

(Continued)

OTHER PUBLICATIONS

Cao, Feng, et al. "MCHFormer: A Multi-Cross Hybrid Former of Point-Image for 3D Object Detection." IEEE Transactions on Intelligent Vehicles (2023). (Year: 2023).*
(Continued)

*Primary Examiner* — Bobbak Safaipour
(74) *Attorney, Agent, or Firm* — Rimon PC; Marc S. Kaufman (57) ABSTRACT

Method of training an object detector for predicting centers of mass of objects projected onto a ground is provided. The method includes steps of: acquiring training images from training data set; inputting each of training images into the object detector to thereby instruct the object detector to perform object detection for the training images and thus generate object detection results including (i) information on predicted bounding boxes, corresponding to one or more ROIs, acquired by predicting each of locations of the objects in the training images and (ii) information on predicted projection points acquired by projecting the centers of mass of the objects onto the ground; and training the object detector by using object detection losses generated by referring to the object detection results and information on ground truths corresponding to the training images.

18 Claims, 6 Drawing Sheets

(51) Int. Cl.
*G06V 10/764* (2022.01)
*G06V 10/762* (2022.01)

(52) U.S. Cl.
CPC .. *G06V 10/764* (2022.01); *G06T 2207/20081* (2013.01); *G06V 2201/07* (2022.01)

(56) References Cited

U.S. PATENT DOCUMENTS

| | | | | |
|---|---|---|---|---|
| 2020/0085382 | A1* | 3/2020 | Taerum | G06T 7/0016 |
| 2020/0086487 | A1* | 3/2020 | Johnson | B25J 9/161 |
| 2020/0342600 | A1* | 10/2020 | Sjöstrand | A61B 6/032 |
| 2020/0380675 | A1* | 12/2020 | Golden | G06T 7/143 |
| 2023/0281961 | A1* | 9/2023 | Fazlali | G06V 10/454 |
| | | | | 382/103 |
| 2023/0298373 | A1* | 9/2023 | Shtok | G06V 30/19147 |
| | | | | 382/113 |

OTHER PUBLICATIONS

Zhu, C., 2019. Multi-camera people detection and tracking; 43 pages.

* cited by examiner

GROUND TRUTH:
INFORMATION ON LABELED BOUNDING BOX +
INFORMATION ON LABELED PROJECTION POINT

FIG. 3B

GROUND TRUTH:
INFORMATION ON LABELED BOUNDING BOX

FIG. 4

METHOD FOR TRAINING OBJECT DETECTOR CAPABLE OF PREDICTING CENTER OF MASS OF OBJECT PROJECTED ONTO GROUND, METHOD FOR RECOGNIZING IDENTICAL OBJECT IN SPECIFIC SPACE CAPTURED FROM A PLURALITY OF CAMERAS HAVING DIFFERENT VIEWING FRUSTUMS USING TRAINED OBJECT DETECTOR, AND LEARNING DEVICE AND OBJECT RECOGNIZING DEVICE USING THE SAME

FIELD OF THE DISCLOSURE

The present invention relates to object tracking using a plurality of cameras. More specifically, the present invention relates to performing object detection in each of images taken from a plurality of cameras having viewing frustums that are different from each other by using an object detector capable of predicting one or more centers of mass of objects projected onto a ground, to thereby generate each of object detection results including information on each of bounding boxes and information on each of projection points acquired by projecting each of the centers of mass of each of the objects onto the ground and thus recognize an identical object in a specific space taken from the plurality of cameras having viewing frustums that are different from each other by using information on each of the projection points in each of the objection detection results.

BACKGROUND OF THE DISCLOSURE

For a security of a specific place, a security system using cameras such as CCTV, etc. is being generally used. Such cameras are installed at large buildings, e.g., supermarkets, department stores, research laboratories, public institutions, etc., small buildings, e.g., homes, daycare centers, convenience stores, banks, etc., or public places, e.g., parks, roads, etc. The security system may perform monitoring through real-time video images taken through the cameras or analyze information on the specific place by using recorded video images.

In particular, recently, a tracking method for (i) taking images of an area to be monitored by using a plurality of cameras without a blind spot, (ii) detecting objects including people positioned in each of the images taken from the cameras based on deep learning, and (iii) tracking the objects by associating them.

Briefly explanation on a conventional tracking method using a plurality of cameras is provided as follows.

In response to acquiring images of a specific space taken from each of the cameras having viewing frustums that are different from each other, the conventional tracking method may (i) detect each of objects positioned in each of the images by performing object detection on each of the images taken from each of the cameras using an object detector based on deep learning, (ii) classify characteristics for each of the objects detected in each of the images by using a classifier based on deep learning, for example, genders, ages, colors of cloth, etc. of pedestrians, and (iii) track some of the objects which are moving within each of viewing frustums of each of the cameras through each of single camera tracking technologies. Then, pieces of information acquired by the cameras are fused according to each of the single camera tracking technologies. That is, for cross-camera tracking technology, identical objects are recognized and clustered among all the tracked objects by using each of characteristics corresponding to each of the tracked objects, to thereby perform the object tracking in the specific space by using the cameras having viewing frustums that are different from each other.

However, according to the conventional object tracking method using the cameras, there are drawbacks in that a separate classifier for classifying the characteristics on the detected objects is necessary and that complex operations such as calculating degrees of similarity among various tracked objects using the characteristics of the tracked objects for clustering of the tracked objects must be performed.

Accordingly, the applicant seeks to suggest a solution to perform object tracking using the cameras with a simple method even without adding a separate deep learning-based model such as a classifier.

SUMMARY OF THE DISCLOSURE

It is an object of the present disclosure to solve all the aforementioned problems.

It is another object of the present disclosure to perform object tracking using a plurality of cameras even without adding a separate deep learning-based model such as a classifier.

It is still another object of the present disclosure to allow identical object(s) to be easily recognized by using characteristics of objects even without operations of calculating degrees of similarity among the objects.

It is still yet another object of the present disclosure to generate object detection results including information on each of bounding boxes and information on each of projection points related to each of the objects in an image by using an object detector capable of detecting the projection points acquired by projecting each of centers of mass of each of the objects onto a ground.

It is still yet another object of the present disclosure to allow the identical object(s) to be easily recognized in a specific space through clustering processes using the projection points acquired by projecting each of the centers of mass of each of the objects onto the ground in each of the images taken from each of the cameras.

In accordance with one aspect of the present disclosure, there is provided a method for training an object detector capable of predicting a center of mass of at least one object projected onto a ground, comprising steps of: (a) a learning device acquiring one or more training images from a training data set; (b) the learning device inputting each of the training images into an object detector to thereby instruct the object detector to perform object detection for each of the training images and thus generate each of object detection results including (i) information on each of predicted bounding boxes, corresponding to one or more ROIs, acquired by predicting each of locations of one or more objects in each of the training images and (ii) information on each of predicted projection points acquired by projecting each of centers of mass of each of the objects onto the ground; and (c) the learning device training the object detector by using each of object detection losses generated by referring to each of the object detection results and information on each of ground truths corresponding to each of the training images.

As one example, at the step of (c), wherein, in case a 1-st ground truth corresponding to a 1-st training image which is any one of the training images contains information on a 1-st labeled box and information on a 1-st labeled projection point for a 1-st object which is any one object located in the 1-st training image, the learning device generates a 1-st bounding box loss by referring to a 1-st predicted bounding box and the 1-st labeled box corresponding to the 1-st object, generates a 1-st projection point loss by referring to a 1-st predicted projection point and the 1-st labeled projection point corresponding to the 1-st object, and trains the object detector by using the 1-st bounding box loss and the 1-st projection point loss, and wherein, in case a 2-nd ground truth corresponding to a 2-nd training image which is any one of the training images contains information on a 2-nd labeled box for a 2-nd object which is any one object located in the 2-nd training image and does not contain information on a 2-nd labeled projection point for the 2-nd object, the learning device generates a 2-nd bounding box loss by referring to a 2-nd predicted bounding box and the 2-nd labeled box corresponding to the 2-nd object, generates a 2-nd projection point loss by setting a specific loss related to a 2-nd predicted projection point for the 2-nd object as a preset value, and trains the object detector by using the 2-nd bounding box loss and the 2-nd projection point loss.

As one example, at the step of (b), the learning device instructs the object detector to generate each of the object detection results by further including (iii) information on each of predicted object classes acquired by classifying classes of each of the objects corresponding to each of the ROIs, and wherein, at the step of (c), the learning device further generates each of object class losses for each of the ROIs by referring to information on each of predicted object classes and information on each of labeled object classes further contained in information on each of the ground truths, and trains the object detector by further using each of the object class losses.

As one example, at the step of (c), the learning device, in response to a mini batch comprised of a plurality of training images sampled from the training data set, acquires each of object detection results corresponding to each of the plurality of training images by performing the step of (b) for each of the plurality of training images included in the mini batch, generates a mini batch loss by referring to the bounding box losses and the projection point losses corresponding to each of the plurality of training images, and trains the object detector by using the mini batch loss.

In accordance with another aspect of the present disclosure, there is provided a method for recognizing an identical object in a specific space taken from a plurality of cameras having viewing frustums that are different from each other by using an object detector capable of predicting centers of mass of objects projected onto a ground, comprising steps of: (a) in response to a 1-st test image to an n-th test image acquired by taking the specific space from a 1-st camera to an n-th camera having viewing frustums that are different from each other, wherein the n is an integer of 2 or more, an object recognizing device (i) inputting each of the 1-st test image to the n-th test image into an object detector trained to predict one or more centers of mass of one or more objects projected onto the ground, to thereby instruct the object detector to perform object detection on each of the 1-st test image to the n-th test image, or (ii) inputting each of the 1-st test image to the n-th test image into each of a 1-st object detector to an n-th object detector, wherein the 1-st object detector corresponds to the 1-st camera and the n-th objector corresponds to the n-th camera, to thereby instruct each of the 1-st object detector to the n-th object detector to perform object detection on the 1-st test image to the n-th test image and thus acquire 1-st object detection information to n-th object detection information, wherein the 1-st object detection information contains information on one or more 1-st bounding boxes for one or more 1-st objects positioned in the 1-st test image and information on one or more 1-st projection points acquired by projecting one or more centers of mass of the 1-st objects onto the ground and information on the n-th object detection contains information on one or more n-th bounding boxes for one or more n-th objects positioned in the n-th test image and information on one or more n-th projection points acquired by projecting one or more centers of mass of the n-th objects onto the ground; (b) the object recognizing device projecting each of the 1-st object detection information to the n-th object detection information onto a top view map for the specific space; and (c) the object recognizing device (i) assigning each of clusters that are different from each other to all of the 1-st projection points included in the 1-st object detection information projected onto the top view map to thereby generate 1-st stage-derived clustering information, (ii) while increasing k from 2 to n, determining whether a specific cluster exists or not, among all clusters included in a (k−1)-th stage-derived clustering information, whose distance from all k-th projection points included in k-th object detection information projected onto the top view map is shortest within a preset distance, to thereby generate a k-th stage-derived clustering information, and (iii) recognizing all clusters included in the n-th stage-derived clustering information as each of objects by referring to n-th stage-derived clustering information.

As one example, wherein, at said (ii) of the step of (c), for a (1_k)-th projection point which is any one among all the k-th projection points, in case a 1_(k−1)-th cluster exists, among all clusters included in the (k−1)-th stage-derived clustering information, whose distance is shortest within the preset distance, the object recognizing device combines the (1_k)-th projection point with the 1_(k−1)-th cluster, and wherein, for a (2_k)-th projection point which is any one among all the k-th projection points, in case the specific cluster does not exist, among all the clusters included in the (k−1)-th stage-derived clustering information, whose distance is shortest within the preset distance, the object recognizing device assigns the (2_k)-th projection point to a new cluster.

As one example, at the step of (c), the object recognizing device calculates Euclid distance between all clusters included in the (k−1)-th stage-derived clustering information and a specific k-th projection point projected onto the top view map to thereby confirm a closest cluster within the preset distance by using the Euclid distance calculated.

As one example, at the step of (b), the object recognizing device projects pixels of each of the 1-st test image to the n-th test image onto the top view map through homography transformation, wherein the 1-st test image contains the 1-st object detection information and the n-th test image contains the n-th object detection information.

As one example, the object detector is trained to predict one or more centers of mass of one or more objects projected onto the ground by using a training image by a learning device, and wherein the learning device (i) inputs one or more training images acquired from a training data set into the object detector to thereby instruct the object detector to perform object detection on each of the training images and thus generate each of object detection results for training including information on each of predicted bounding boxes, corresponding to one or more ROIs for training, acquired by predicting each of locations of one or more objects for training in each of the training images and information on each of predicted projection points acquired by projecting each of centers of mass of each of the objects for training onto the ground and (ii) trains the object detector by using each of object detection losses generated by referring to each of the object detection results and information on each of ground truths corresponding to each of the training images.

In accordance with still another aspect of the present disclosure, there is provided a learning device for training an object detector capable of predicting a center of mass of at least one object projected onto a ground, comprising: a memory that stores instructions for training the object detector capable of predicting the center of mass of the object projected onto the ground, and a processor configured to train the object detector capable of predicting the center of mass of the object projected onto the ground; wherein the processor performs: (I) a process of acquiring one or more training images from a training data set; (II) a process of inputting each of the training images into an object detector to thereby instruct the object detector to perform object detection for each of the training images and thus generate each of object detection results including (i) information on each of predicted bounding boxes, corresponding to one or more ROIs, acquired by predicting each of locations of one or more objects in each of the training images and (ii) information on each of predicted projection points acquired by projecting each of centers of mass of each of the objects onto the ground; and (III) a process of training the object detector by using each of object detection losses generated by referring to each of the object detection results and information on each of ground truths corresponding to each of the training images.

As one example, at the process of (III), wherein, in case a 1-st ground truth corresponding to a 1-st training image which is any one of the training images contains information on a 1-st labeled box and information on a 1-st labeled projection point for a 1-st object which is any one object located in the 1-st training image, the processor generates a 1-st bounding box loss by referring to a 1-st predicted bounding box and the 1-st labeled box corresponding to the 1-st object, generates a 1-st projection point loss by referring to a 1-st predicted projection point and the 1-st labeled projection point corresponding to the 1-st object, and trains the object detector by using the 1-st bounding box loss and the 1-st projection point loss, and wherein, in case a 2-nd ground truth corresponding to a 2-nd training image which is any one of the training images contains information on a 2-nd labeled box for a 2-nd object which is any one object located in the 2-nd training image and does not contain information on a 2-nd labeled projection point for the 2-nd object, the processor generates a 2-nd bounding box loss by referring to a 2-nd predicted bounding box and the 2-nd labeled box corresponding to the 2-nd object, generates a 2-nd projection point loss by setting a specific loss related to a 2-nd predicted projection point for the 2-nd object as a preset value, and trains the object detector by using the 2-nd bounding box loss and the 2-nd projection point loss.

As one example, at the process of (II), the processor instructs the object detector to generate each of the object detection results by further including (iii) information on each of predicted object classes acquired by classifying classes of each of the objects corresponding to each of the ROIs, and wherein, at the step of (c), the processor further generates each of object class losses for each of the ROIs by referring to information on each of predicted object classes and information on each of labeled object classes further contained in information on each of the ground truths, and trains the object detector by further using each of the object class losses.

As one example, the processor at the process of (III), in response to a mini batch comprised of a plurality of training images sampled from the training data set, the processor acquires each of object detection results corresponding to each of the plurality of training images by performing the step of (b) for each of the plurality of training images included in the mini batch, generates a mini batch loss by referring to the bounding box losses and the projection point losses corresponding to each of the plurality of training images, and trains the object detector by using the mini batch loss.

In accordance with still yet another aspect of the present disclosure, there is provided an object recognizing device for recognizing an identical object in a specific space taken from a plurality of cameras having viewing frustums that are different from each other by using an object detector capable of predicting centers of mass of objects projected onto a ground, comprising: a memory that stores instructions for recognizing the identical object in the specific space taken from the plurality of cameras having viewing frustums that are different from each other by using the object detector capable of predicting the centers of mass of the objects projected onto the ground; and a processor for recognizing the identical object in the specific space taken from the plurality of cameras having viewing frustums that are different from each other by using the object detector capable of predicting the centers of mass of the objects projected onto the ground; wherein the processor performs processes of (I) in response to a 1-st test image to an n-th test image acquired by taking the specific space from a 1-st camera to an n-th camera having viewing frustums that are different from each other, wherein the n is an integer of 2 or more, (i) inputting each of the 1-st test image to the n-th test image into an object detector trained to predict one or more centers of mass of one or more objects projected onto the ground, to thereby instruct the object detector to perform object detection on each of the 1-st test image to the n-th test image, or (ii) inputting each of the 1-st test image to the n-th test image into each of a 1-st object detector to an n-th object detector, wherein the 1-st object detector corresponds to the 1-st camera and the n-th objector corresponds to the n-th camera, to thereby instruct each of the 1-st object detector to the n-th object detector to perform object detection on the 1-st test image to the n-th test image and thus acquire 1-st object detection information to n-th object detection information, wherein the 1-st object detection information contains information on one or more 1-st bounding boxes for one or more 1-st objects positioned in the 1-st test image and information on one or more 1-st projection points acquired by projecting one or more centers of mass of the 1-st objects onto the ground and information on the n-th object detection contains information on one or more n-th bounding boxes for one or more n-th objects positioned in the n-th test image and information on one or more n-th projection points acquired by projecting one or more centers of mass of the n-th objects onto the ground; (II) projecting each of the 1-st object detection information to the n-th object detection information onto a top view map for the specific space; and (III) (i) assigning each of clusters that are different from each other to all of the 1-st projection points included in the 1-st object detection information projected onto the top view map to thereby generate 1-st stage-derived clustering information, (ii) while increasing k from 2 to n, determining whether a specific cluster exists or not, among all clusters included in a (k−1)-th stage-derived clustering information, whose distance from all k-th projection points included in k-th object detection information projected onto the top view map is shortest within a preset distance, to thereby generate a k-th stage-derived clustering information, and (iii) recognizing all clusters included in the n-th stage-derived clustering information as each of objects by referring to n-th stage-derived clustering information.

As one example, at said (ii) of the process of (III), for a (1_k)-th projection point which is any one among all the k-th projection points, in case a 1_(k−1)-th cluster exists, among all clusters included in the (k−1)-th stage-derived clustering information, whose distance is shortest within the preset distance, the processor combines the (1_k)-th projection point with the 1_(k−1)-th cluster, and wherein, for a (2_k)-th projection point which is any one among all the k-th projection points, in case the specific cluster does not exist, among all the clusters included in the (k−1)-th stage-derived clustering information, whose distance is shortest within the preset distance, the processor assigns the (2_k)-th projection point to a new cluster.

As one example, at the process of (III), the processor calculates Euclid distance between all clusters included in the (k−1)-th stage-derived clustering information and a specific k-th projection point projected onto the top view map to thereby confirm a closest cluster within the preset distance by using the Euclid distance calculated.

As one example, at the process of (II), the processor projects pixels of each of the 1-st test image to the n-th test image onto the top view map through homography transformation, wherein the 1-st test image contains the 1-st object detection information and the n-th test image contains the n-th object detection information.

As one example, the object detector is trained to predict one or more centers of mass of one or more objects projected onto the ground by using a training image by a learning device, and wherein the learning device (i) inputs one or more training images acquired from a training data set into the object detector to thereby instruct the object detector to perform object detection on each of the training images and thus generate each of object detection results for training including information on each of predicted bounding boxes, corresponding to one or more ROIs for training, acquired by predicting each of locations of one or more objects for training in each of the training images and information on each of predicted projection points acquired by projecting each of centers of mass of each of the objects for training onto the ground and (ii) trains the object detector by using each of object detection losses generated by referring to each of the object detection results and information on each of ground truths corresponding to each of the training images.

In addition, recordable media that are readable by a computer for storing a computer program to execute the method of the present disclosure is further provided.

BRIEF DESCRIPTION OF THE DRAWINGS

The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to carry out the present disclosure easily, the example embodiments of the present disclosure will be explained by referring to attached diagrams in detail as shown below.

Figure 1:
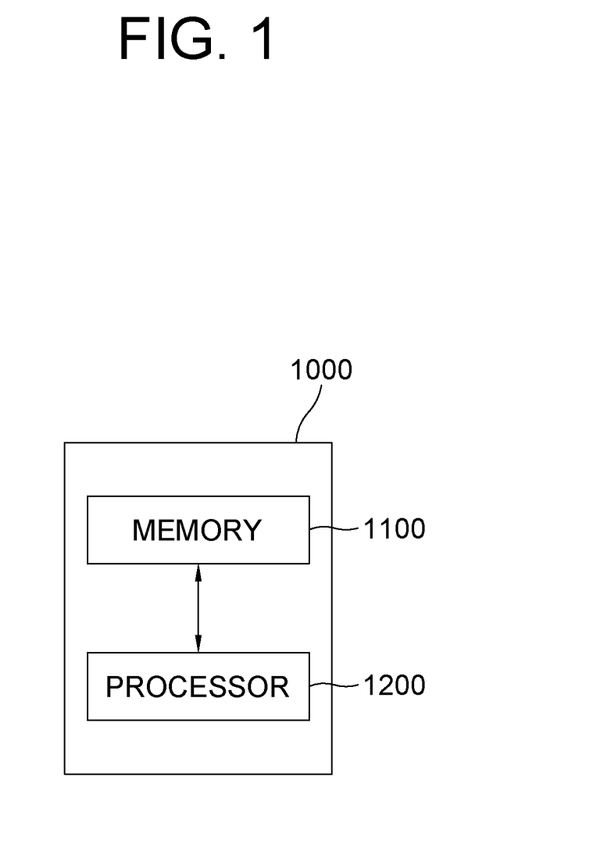
FIG. 1 is a drawing schematically illustrating a learning device for training an object detector capable of predicting at least one center of mass of at least one object projected onto a ground in accordance with one example embodiment of the present disclosure.

FIG. 1 schematically illustrating a learning device 100 for training an object detector capable of predicting at least one center of mass of at least one object projected onto a ground in accordance with one example embodiment of the present disclosure, and the learning device 1000 may include a memory 1100 for storing instructions for training the object detector capable of predicting the center of mass of the at least one object projected onto the ground, and a processor 1200 configured to train the object detector capable of predicting the center of mass of the at least one object projected onto the ground according to the instructions in the memory 1100.

Specifically, the learning device 1000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

Meanwhile, the processor 1200 of the learning device 1000 may, according to the instructions stored in the memory 1100, perform: (I) a process of acquiring one or more training images from a training data set; (II) a process of inputting each of the training images into the object detector to thereby instruct the object detector to perform object detection for each of the training images and thus generate each of object detection results including (i) information on each of predicted bounding boxes, corresponding to one or more ROIs, acquired by predicting each of locations of one or more objects in each of the training images and (ii) information on each of predicted projection points acquired by projecting each of centers of mass of each of the objects onto the ground; and (III) a process of training the object detector by using each of object detection losses generated by referring to each of the object detection results and information on each of ground truths corresponding to each of the training images.

A method for training the object detector capable of predicting the centers of mass of the objects projected onto the ground by using the learning device 1000 in accordance with another example embodiment of the present disclosure configured as above is explained as follows.

Figure 2:
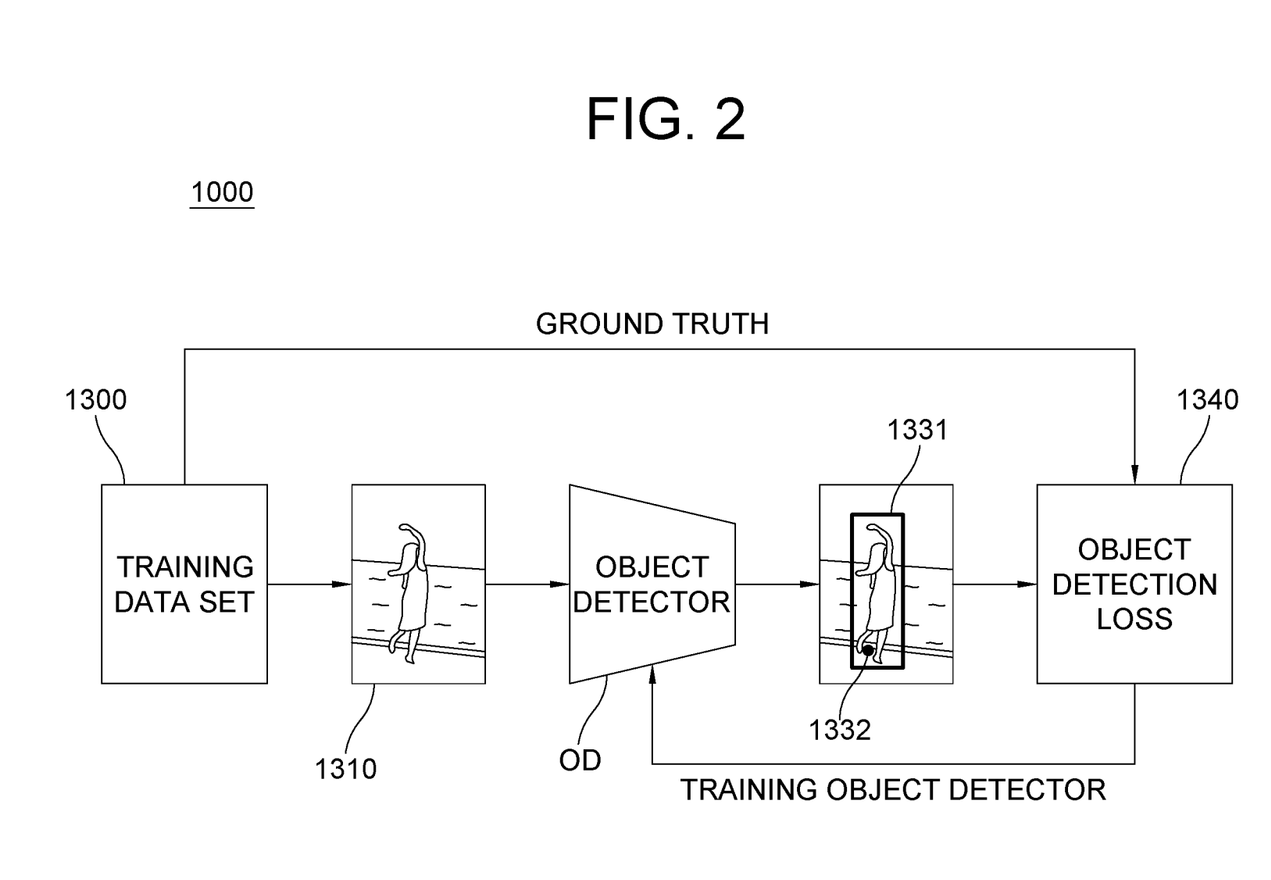
FIG. 2 is a drawing schematically illustrating a method for training an object detector capable of predicting the center of mass of the object projected onto the ground in accordance with one example embodiment of the present disclosure.

Firstly, by referring to FIG. 2, the learning device 100 may acquire one or more training images 1310 from a training data set 1300.

Herein, the training data set may include training images to be used for training of the object detector OD, and each of ground truths may be labeled to each of the training images.

For reference, processes of generating the training images are as follows: After acquiring some images including one or more objects to be used for training the object detector OD, information on bounding boxes corresponding to ROIs (Regions Of Interest), i.e., areas where each of objects is located in the images and information on projection points acquired by projecting each of the centers of mass of each of the objects onto the ground are labeled to generate ground truths. Depending on the cases, information on classes for the objects may be further labeled as the ground truths.

As another example, the training images may be generated by further labeling information on each of the projection points to original training images (to be used for training the conventional object detector) where information on each of the bounding boxes is labeled.

Figure 3A:
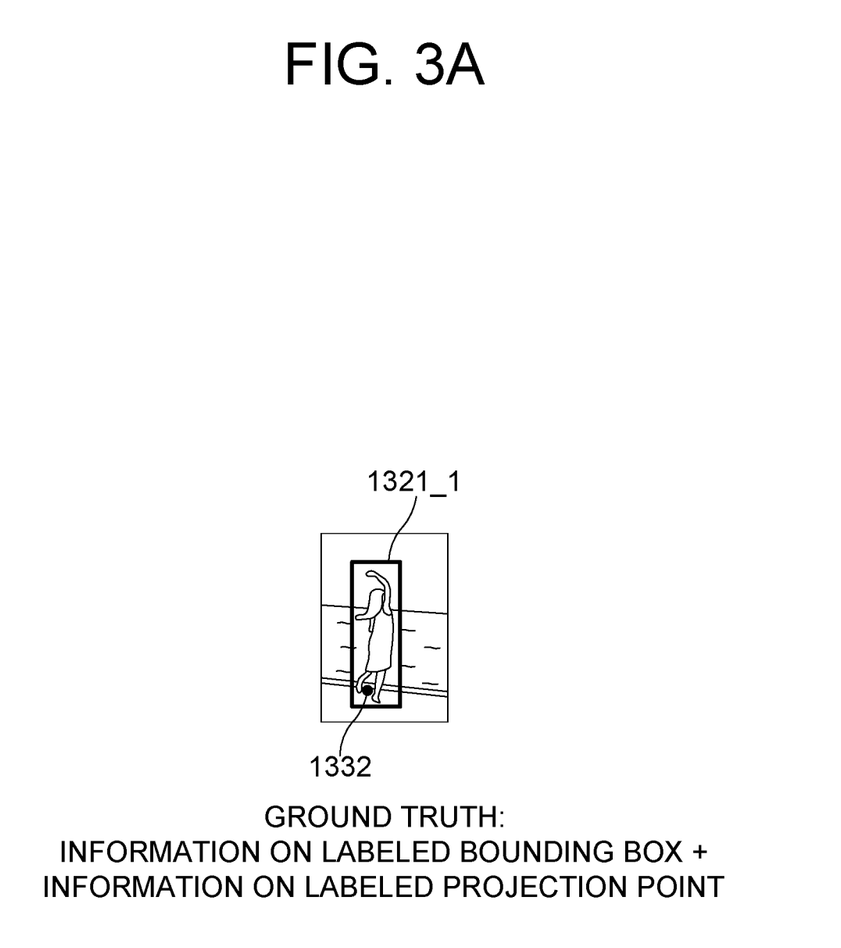
FIG. 3A and FIG. 3B are drawings exemplarily illustrating ground truths corresponding to a training image to be used for training the object detector in accordance with one example embodiment of the present disclosure.
Figure 3B:
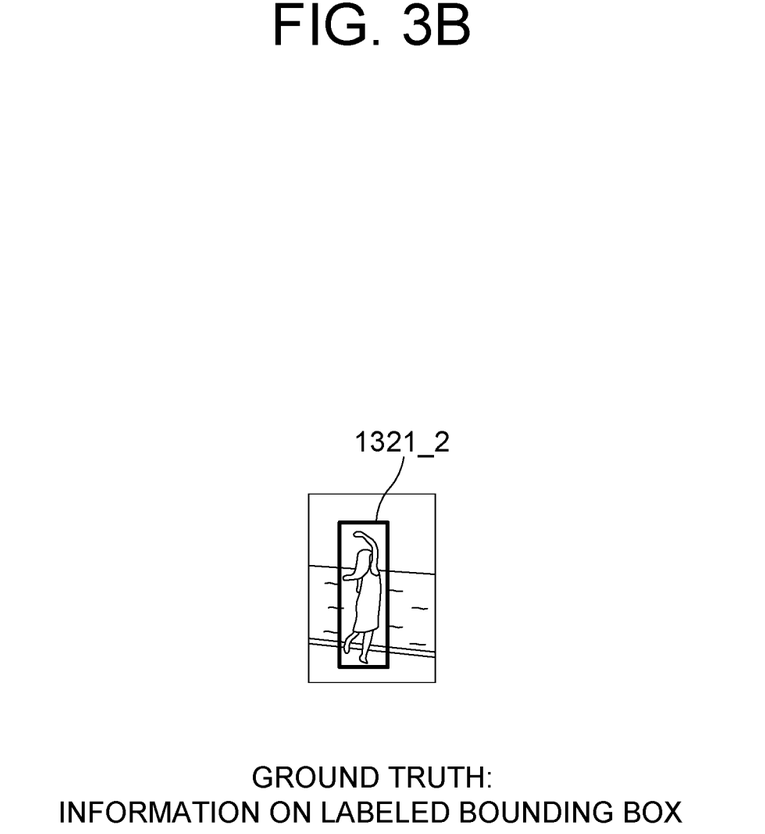

In addition, as a first example, a bounding box 1321_1 and a projection point 1322 may be labeled as ground truths to each of training images, as in FIG. 3A, or as a second example, the bounding box 1321_1 and the projection point 1322 may be labeled as ground truths to some of the training images as in FIG. 3A and only the bounding box 1321_2 may be labeled as ground truths to the rest of the training images as in FIG. 3B.

By referring to FIG. 2 again, the learning device 1000 inputs each of the training images 1310 into the object detector OD to thereby instruct the object detector to perform object detection for each of the training images 1310.

Accordingly, the object detector OD generates each of object detection results including (i) information on each of predicted bounding boxes, corresponding to one or more ROIs, acquired by predicting each of locations of one or more objects in each of the training images and (ii) information on each of predicted projection points acquired by projecting each of centers of mass of each of the objects onto the ground. For reference, one example of the predicted bounding boxes is represented as 1331 and one example of the predicted projection points is represented as 1332 as shown in FIG. 2.

Thereafter, the learning device 1000 trains the object detector OD by using each of object detection losses generated by referring to each of the object detection results and each of the ground truths corresponding to each of the training images. For reference, one example of the object detection losses is represented as 1340 as shown in FIG. 2.

Herein, in case a 1-st ground truth corresponding to a 1-st training image which is one of the training images 1310 contains information on a 1-st labeled box and information on a 1-st labeled projection point for a 1-st object which is any one object located in the 1-st training image, the learning device 1000 may generate a 1-st bounding box loss by referring to a 1-st predicted bounding box and the 1-st labeled box corresponding to the 1-st object, may generate a 1-st projection point loss by referring to a 1-st predicted projection point and the 1-st labeled projection point corresponding to the 1-st object, and may train the object detector OD by using the 1-st bounding box loss and the 1-st projection point loss.

As another example, in case a 2-nd ground truth corresponding to a 2-nd training image which is one of the training images 1310 contains information on a 2-nd labeled box for a 2-nd object which is any one object located in the 2-nd training image and does not contain information on a 2-nd labeled projection point for the 2-nd object, the learning device 1000 may generate a 2-nd bounding box loss by referring to a 2-nd predicted bounding box and the 2-nd labeled box corresponding to the 2-nd object, may generate a 2-nd projection point loss by setting a specific loss related to a 2-nd predicted projection point for the 2-nd object as a preset value, and may train the object detector OD by using the 2-nd bounding box loss and the 2-nd projection point loss. That is, in case there is no ground truth information on some of the projection points, the learning device 1000 may train the object detector OD by setting a projection point loss as a preset value through semi-supervised learning. As one example, in case there is no information on the 2-nd labeled projection point for the 2-nd object, the learning device 1000 may train the object detector OD by using only the 2-nd bounding box loss on condition that the 2-nd projection point loss for the 2-nd object is set to "0". As still another example, in case there is no information on the 2-nd labeled projection point, in response to determining that it corresponds to a similar pose of an identical object, the loss may be calculated by using other training data including projection points corresponding to the similar pose as their ground truths.

In addition, the learning device 1000 may instruct the object detector OD to generate each of the object detection results such that each of the object detection results further includes (iii) information on each of predicted object classes acquired by classifying each of classes for each of the objects corresponding to each of the ROIs, and may further generate each of object class losses for each of the ROIs by referring to information on each of predicted object classes and information on each of labeled object classes contained in information on each of the ground truths, and may train the object detector OD by further using each of the object class losses.

In addition, in response to receiving a mini batch comprised of a plurality of training images sampled from the training data set 1300, the learning device 1000 may acquire each of the object detection results corresponding to each of the plurality of training images by performing object detection for each of the plurality of training images included in the mini batch, may generate a mini batch loss by referring to the bounding box losses and the projection point losses corresponding to the plurality of training images, and may train the object detector OD by using the mini batch loss.

Meanwhile, the object detector OD according to the present invention may further use various object detection models based on deep learning such as R-CNN, Fast R-CNN, Faster R-CNN, SSD, YOLO, and may further detect projection points by modifying conventional object detection models.

As one example, in case a function of detecting projection points is added to YOLOv5s6 which is a conventional object detector, the number of parameters was increased by just 0.04% compared to the original model, and the FLOPs (i.e., Floating Point Operation) were increased by just 0.07%. Accordingly, although the object detector according to the present invention has almost similar amount of operation compared to the conventional object detector, it can detect projection points by projecting each of the centers of mass of each of the objects onto the ground.

Herein, the object detector OD according to the present invention may be easily implemented by expanding the dimension of the last channel of the conventional object detector.

As one example, in case of the conventional YOLOv5, the size of the dimension of the last channel may be represented as follows.

number of anchors×[5(width,height,x_center,y_center,confidence)+number of classes]

The "number of anchors" is the number of detected ROI, the "width" and the "height" are the width and the height of the bounding box, the "x_center" and the "y_center" are x, y coordinates of the center point of the bounding box, and the confidence is a probability that the object will be located in the bounding box or a probability that the object will be located in the ROI, and the "number of classes" may be the number of classes set for classifying the object.

In addition, in case the dimension of the last channel is expanded from the conventional YOLOv5 to detect the projection points, the size can be represented as follows.

Number of anchors×[7(width,height,x_center,y_center,confidence,x_projection point,y_projection point)+number of classes]

The x_projection point and the y_projection point may be x, y coordinates of the projection point.

Accordingly, the object detector OD according to the present invention performs object detection with similar amount of operations as the conventional object detector to detect one or more objects located in the input image, thereby outputting one or more object detection results including information on each of bounding boxes and each of projection points corresponding to each of the objects.

Figure 4:
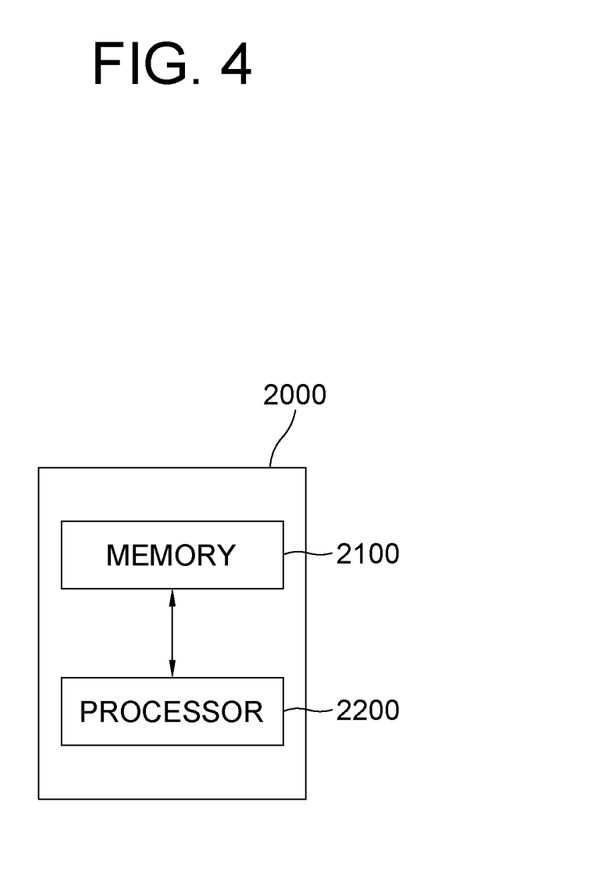
FIG. 4 is a drawing schematically illustrating an object recognizing device for recognizing an identical object(s) in a specific space taken from a plurality of cameras having viewing frustums that are different from each other by using an object detector capable of predicting centers of mass of objects projected onto a ground in accordance with another example embodiment of the present disclosure.

FIG. 4 is a drawing schematically illustrating an object recognizing device for recognizing an identical object in a specific space taken from a plurality of cameras having viewing frustums that are different from each other by using an object detector capable of predicting centers of mass of objects projected onto a ground in accordance with another example embodiment of the present disclosure, and by referring to FIG. 4, the object recognizing device 2000 may comprise a memory 2100 that stores instructions for recognizing the identical object in the specific space taken from the plurality of cameras having viewing frustums that are different from each other by using the object detector capable of predicting the centers of mass of the objects projected onto the ground, and a processor 2200 for recognizing the identical object in the specific space taken from the plurality of cameras having viewing frustums that are different from each other by using the object detector capable of predicting the centers of mass of the objects projected onto the ground.

Specifically, the object recognizing device 2000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

Meanwhile, according to the instructions stored in the memory 2100, the processor 2200 of the object recognizing device 2000 may perform a process of: (I) in response to a 1-st test image to an n-th test image acquired by taking the specific space from a 1-st camera to an n-th camera having viewing frustums that are different from each other, (i) inputting each of the 1-st test image to the n-th test image into the object detector trained to predict one or more centers of mass of one or more objects projected onto the ground, to thereby instruct the object detector to perform object detection on each of the 1-st test image to the n-th test image, or (ii) inputting each of the 1-st test image to the n-th test image into each of a 1-st object detector to an n-th object detector, wherein the 1-st object detector corresponds to the 1-st camera and the n-th objector corresponds to the n-th camera, to thereby instruct each of the 1-st object detector to the n-th object detector to perform object detection on the 1-st test image to the n-th test image and thus acquire 1-st object detection information to n-th object detection information. Herein the 1-st object detection information contains information on one or more 1-st bounding boxes for one or more 1-st objects positioned in the 1-st test image and information on one or more 1-st projection points acquired by projecting one or more centers of mass of the 1-st objects onto the ground. Further, the n-th object detection information contains information on one or more n-th bounding boxes for one or more n-th objects positioned in the n-th test image and information on one or more n-th projection points acquired by projecting one or more centers of mass of the n-th objects onto the ground. The n may be an integer of 2 or more. In addition, the processor 2200 may perform a process of (II) projecting each of the 1-st object detection information to the n-th object detection information onto a top view map for the specific space. Thereafter, the processor 2200 may perform a process of (III) (i) assigning each of clusters that are different from each other to all of the 1-st projection points included in the 1-st object detection information projected onto the top view map to thereby generate 1-st stage-derived clustering information, (ii) while increasing k from 2 to n, determining whether a specific cluster exists or not, among all clusters included in a (k−1)-th stage-derived clustering information, whose distance from all k-th projection points included in k-th object detection information projected onto the top view map is shortest within a preset distance, to thereby generate a k-th stage-derived clustering information, and (iii) recognizing all clusters included in the n-th stage-derived clustering information as each of objects by referring to n-th stage-derived clustering information.

Figure 5:
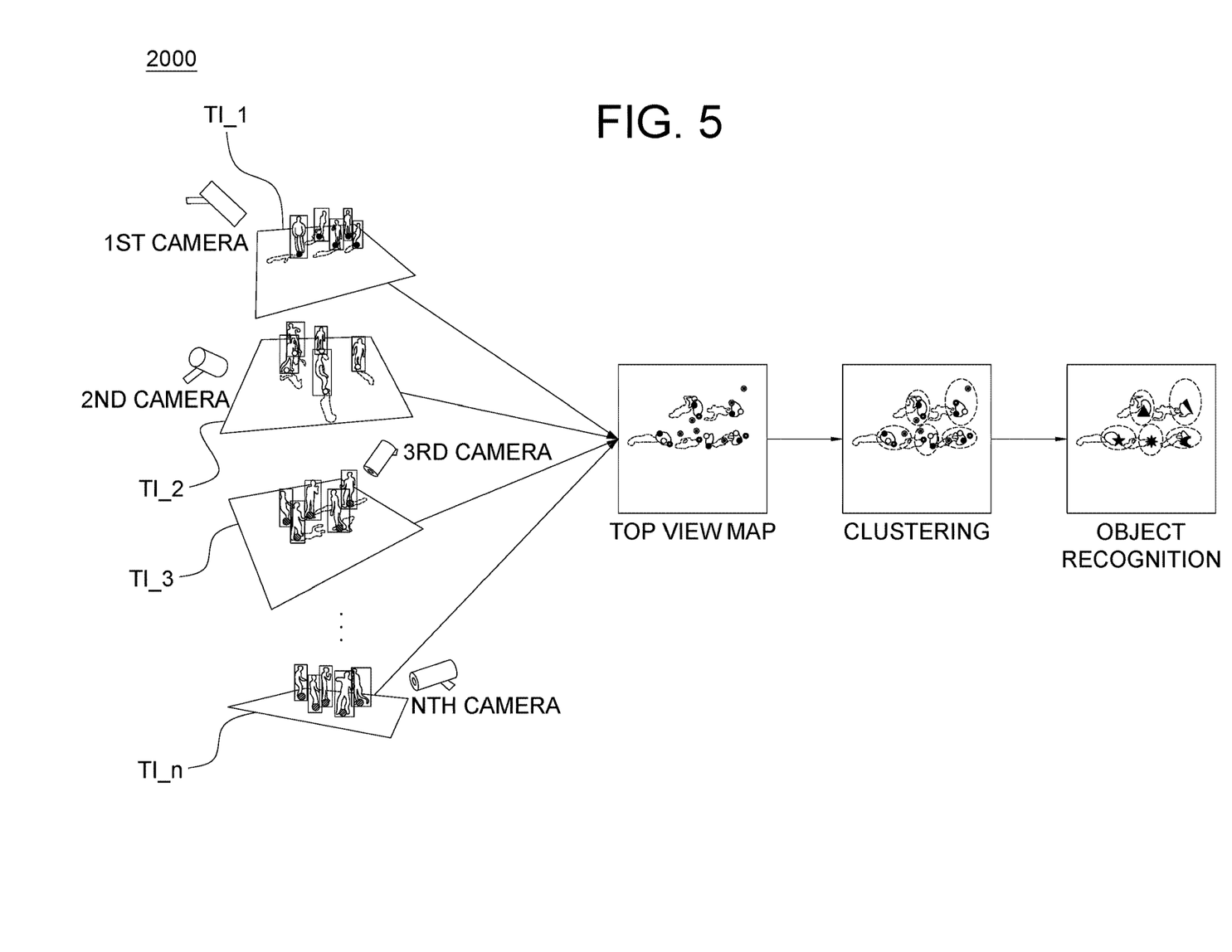
FIG. 5 is a drawing schematically illustrating a method for recognizing the identical object(s) in the specific space taken from the cameras having viewing frustums that are different from each other by using the object detector capable of predicting the centers of mass of the objects projected onto the ground in accordance with another example embodiment of the present disclosure.

A method for recognizing an identical object in the specific space taken from the plurality of cameras having viewing frustums that are different from each other by using the object detector capable of predicting the centers of mass of the objects projected onto the ground by using the object recognizing device 2000 in accordance with another example embodiment of the present disclosure is explained with a reference to FIG. 5 as follows.

Firstly, in response to a 1-st test image TI_1 to an n-th test image TI_n acquired by taking the specific space from the 1-st camera to the n-th camera having viewing frustums that are different from each other, the object recognizing device 2000 may input each of the 1-st test image TI_1 to the n-th test image TI_n into the object detector trained to predict one or more centers of mass of one or more objects projected onto the ground, to thereby instruct the object detector to perform object detection on each of the 1-st test image TI_1 to the n-th test image TI_n.

As another example, in response to the 1-st test image TI_1 to the n-th test image TI_n acquired by taking the specific space from the 1-st camera to the n-th camera having viewing frustums that are different from each other, the object recognizing device 2000 may input each of the 1-st test image TI_1 to the n-th test image TI_n into each of the 1-st object detector to the n-th object detector, wherein the 1-st object detector corresponds to the 1-st camera and the n-th objector corresponds to the n-th camera, to thereby instruct each of the 1-st object detector to the n-th object detector to perform object detection on the 1-st test image TI_1 to the n-th test image TI_n and thus acquire the 1-st object detection information to the n-th object detection information. Herein, the object detector may have been trained to predict each of the centers of mass of each of the objects projected onto the ground by using the training images by a learning device.

That is, according to the present invention, on condition that the object detector has been trained to predict the projection points which are centers of mass of objects projected onto the ground, one trained object detector can be used to perform object detection on each of the 1-st test image TI_1 to the n-th test image TI_n, or n trained object detectors can be used to perform object detection on each of the 1-st test image TI_1 to the n-th test image TI_n.

In more specific explanation regarding training of the object detector, the learning device (i) inputs one or more training images acquired from a training data set into the object detector to thereby instruct the object detector to perform object detection on each of the training images and thus generate each of object detection results for training including information on each of predicted bounding boxes, corresponding to one or more ROIs for training, acquired by predicting each of locations of one or more objects for training in each of the training images and information on each of predicted projection points acquired by projecting each of centers of mass of each of the objects for training onto the ground and (ii) trains the object detector by using each of object detection losses generated by referring to each of the object detection results and information on each of ground truths corresponding to each of the training images. That is, the object detector may have been trained to predict the centers of mass of the objects projected onto the ground by the learning method explained with reference to FIG. 2.

By the method above, the object recognizing device 2000 may acquire the 1-st object detection information to the n-th object detection information generated by one object detector or said n object detectors.

That is, the object recognizing device 2000 may acquire the 1-st object detection information to the n-th object detection information. Herein the 1-st object detection information contains information on one or more 1-st bounding boxes for one or more 1-st objects positioned in the 1-st test image TI_1 and information on one or more 1-st projection points acquired by projecting one or more centers of mass of the 1-st objects onto the ground. Further, the n-th object detection information contains information on one or more n-th bounding boxes for one or more n-th objects positioned in the n-th test image TI_n and information on one or more n-th projection points acquired by projecting one or more centers of mass of the n-th objects onto the ground.

Next, the object recognizing device 2000 may project each of the 1-st object detection information to the n-th object detection information onto the top view map for the specific space.

Herein, the object recognizing device 2000 may project the 1-st object detection information to the n-th object detection information onto the top view map by using technologies such as camera calibration, homography transformation and 3D reconstruction. In addition, the object recognizing device 2000 may project pixels of each of the 1-st test image TI_1 to the n-th test image TI_n onto the top view map through the homography transformation, wherein the 1-st test image contains the 1-st object detection information and the n-th test image contains the n-th object detection information. That is, the object recognizing device 2000 may synthesize the 1-st test image TI_1 to the n_th test image TI_n, and then project 1-st projection points to n-th projection points in the 1-st object detection information to the n-th object detection information to the top view map.

Next, the object recognizing device 2000 may (i) assign each of clusters that are different from each other to all of the 1-st projection points included in the 1-st object detection information projected onto the top view map to thereby generate the 1-st stage-derived clustering information, (ii) while increasing k from 2 to n, determine whether a specific cluster exists or not, among all the clusters included in the (k−1)-th stage-derived clustering information, whose distance from all the k-th projection points included in the k-th object detection information projected onto the top view map is shortest within the preset distance, to thereby generate the k-th stage-derived clustering information, and (iii)

recognize each of the objects as all the clusters included in the n-th stage-derived clustering information by referring to n-th stage-derived clustering information.

Herein, the object recognizing device 2000 may calculate Euclid distance between all clusters included in the (k−1)-th stage-derived clustering information and a specific k-th projection point projected onto the top view map to thereby confirm a closest cluster within the preset distance by using the Euclid distance calculated.

In addition, in case a 1_(k−1)-th cluster exists, among all clusters included in the (k−1)-th stage-derived clustering information, whose distance is shortest within the preset distance from a (1_k)-th projection point which is any one among all the k-th projection points, the object recognizing device 2000 may combine the (1_k)-th projection point with the 1_(k−1)-th cluster, and in case the 1_(k−1)-th cluster does not exist, among all the clusters included in the (k−1)-th stage-derived clustering information, whose distance is shortest within the preset distance from a (2_k)-th projection point which is any one among all the k-th projection points, the object recognizing device 2000 may assign the (2_k)-th projection point to a new cluster.

As one example, the object recognizing device 2000 may set each of the 1-st projection points detected in the 1-st test image to each of clusters. That is, the objects detected in the image taken from one camera are objects that are different from each other, and accordingly, each of the 1-st projection points corresponding to each of the objects detected in the 1-st image may be assigned to each of the clusters for object recognition, to thereby generate the 1-st stage-derived clustering information.

Further, the object recognizing device 2000 may confirm a closest cluster within the preset distance for 2-nd projection points detected in a 2-nd test image.

Herein, for a (2_1)-st projection point which is any one among all the 2-nd projection points, in case it is confirmed that one or more clusters exist within the preset distance, the object recognizing device 2000 may combine the (2_1) projection point with the closest cluster. That is, the object detected from the 2-nd test image corresponding to the (2_1)-st projection point may be determined as the identical object to the object detected from the 1-st test image corresponding to the closest cluster. In addition, for a (2_2) projection point which is any one among the 2-nd projection points, in case it is confirmed that one or more clusters do not exist within the preset distance, the object recognizing device 2000 may assign a (2_2)-nd projection point to a new cluster. That is, the object detected from the 2-nd test image corresponding to the (2_2)-nd projection point may be determined as a different object from the objects detected from the 1-st test image. By performing such an operation on all of the 2-nd projection points, the object recognizing device 2000 updates the assigned cluster of the 1-st stage-derived clustering information by using a newly assigned cluster, to thereby combine the clusters assigned by 1-st projection points with the 2-nd projection points and thus generate 2-nd stage-derived clustering information including the newly assigned clusters.

By sequentially proceeding such operations, in response to generating the n-th stage-derived clustering information as a result of clustering the n-th projection points, the object recognizing device 2000 recognizes each of clusters included in the n-th stage-derived clustering information as each of individual objects, and accordingly, all the objects detected from the 1-st test image to the n-th test image may be recognized.

According to the present disclosure, by performing clustering of the projection points by using only the locational information of the projection points, more accurate clustering may be performed even without using a separate deep learning model for extracting characteristic information compared to conventional clustering such as use of information on bounding boxes or degrees of similarity using characteristic information related to objects.

In addition, according to the present disclosure, various conventional clustering algorithms may be used by setting the projection points on the objects detected in any one image among the images taken from the plurality of cameras as initial clusters. That is, the object recognizing device 2000 may perform clustering by using general clustering algorithms such as K-Means clustering, Hierarchical clustering, DBSCAN clustering, Spectra clustering.

That is, in the tracking of multi object by the conventional multi-cameras, since the number of objects positioned in the specific area continuously changes, general clustering algorithms that requires to set initial cluster number cannot be used, but the present invention may use the general clustering algorithm by setting the projection points on the objects detected in one image as initial clusters.

Meanwhile, the object recognizing device 2000 may perform object tracking between continuous image frames taken from the same camera. That is, the object recognizing device 2000 may perform the single camera tracking by using tracking algorithm based on deep learning such as Kalman Filter, particle filter, or SORT, or DeepSORT on the objects between the continuous image frames taken from one camera. Accordingly, not only object tracking may be performed between the continuous image frames in each of the plurality of cameras, but also as explained above, the cross-camera tracking may be performed through clustering of the projection point for overlapping area taken by the plurality of cameras.

The present disclosure has an effect of performing object tracking using a plurality of cameras with a simple method even without adding a separate deep learning-based model such as a classifier.

Moreover, the present disclosure has another effect of allowing identical object(s) to be easily recognized by using characteristics of objects even without operations of calculating degrees of similarity among the objects.

Moreover, the present disclosure has still another effect of generating object detection results including information on each of bounding boxes and information on each of projection points related to each of the objects in an image by using an object detector capable of detecting the projection points acquired by projecting each of centers of mass of each of the objects onto the ground.

The present disclosure has still yet another effect of allowing the identical object(s) to be easily recognized in the specific space through clustering processes using the projection points acquired by projecting each of the centers of mass of each of the objects onto the ground in each of the images taken from each of the cameras.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for training an object detector capable of predicting a center of mass of at least one object projected onto a ground, comprising steps of:
   (a) a learning device acquiring one or more training images from a training data set;
   (b) the learning device inputting each of the training images into an object detector to thereby instruct the object detector to perform object detection for each of the training images and thus generate each of object detection results including (i) information on each of predicted bounding boxes, corresponding to one or more ROIs, acquired by predicting each of locations of one or more objects in each of the training images and (ii) information on each of predicted projection points acquired by projecting each of centers of mass of each of the objects onto the ground; and
   (c) the learning device training the object detector by using each of object detection losses generated by referring to each of the object detection results and information on each of ground truths corresponding to each of the training images.

2. The method of claim 1, at the step of (c), wherein, in case a 1-st ground truth corresponding to a 1-st training image which is any one of the training images contains information on a 1-st labeled box and information on a 1-st labeled projection point for a 1-st object which is any one object located in the 1-st training image, the learning device generates a 1-st bounding box loss by referring to a 1-st predicted bounding box and the 1-st labeled box corresponding to the 1-st object, generates a 1-st projection point loss by referring to a 1-st predicted projection point and the 1-st labeled projection point corresponding to the 1-st object, and trains the object detector by using the 1-st bounding box loss and the 1-st projection point loss, and wherein, in case a 2-nd ground truth corresponding to a 2-nd training image which is any one of the training images contains information on a 2-nd labeled box for a 2-nd object which is any one object located in the 2-nd training image and does not contain information on a 2-nd labeled projection point for the 2-nd object, the learning device generates a 2-nd bounding box loss by referring to a 2-nd predicted bounding box and the 2-nd labeled box corresponding to the 2-nd object, generates a 2-nd projection point loss by setting a specific loss related to a 2-nd predicted projection point for the 2-nd object as a preset value, and trains the object detector by using the 2-nd bounding box loss and the 2-nd projection point loss.

3. The method of claim 1, wherein, at the step of (b), the learning device instructs the object detector to generate each of the object detection results by further including (iii) information on each of predicted object classes acquired by classifying classes of each of the objects corresponding to each of the ROIs, and wherein, at the step of (c), the learning device further generates each of object class losses for each of the ROIs by referring to information on each of predicted object classes and information on each of labeled object classes further contained in information on each of the ground truths, and trains the object detector by further using each of the object class losses.

4. The method of claim 1, wherein, at the step of (c), the learning device, in response to a mini batch comprised of a plurality of training images sampled from the training data set, acquires each of object detection results corresponding to each of the plurality of training images by performing the step of (b) for each of the plurality of training images included in the mini batch, generates a mini batch loss by referring to the bounding box losses and the projection point losses corresponding to each of the plurality of training images, and trains the object detector by using the mini batch loss.

5. A method for recognizing an identical object in a specific space taken from a plurality of cameras having viewing frustums that are different from each other by using an object detector capable of predicting centers of mass of objects projected onto a ground, comprising steps of:
   (a) in response to a 1-st test image to an n-th test image acquired by taking the specific space from a 1-st camera to an n-th camera having viewing frustums that are different from each other, wherein the n is an integer of 2 or more, an object recognizing device (i) inputting each of the 1-st test image to the n-th test image into an object detector trained to predict one or more centers of mass of one or more objects projected onto the ground, to thereby instruct the object detector to perform object detection on each of the 1-st test image to the n-th test image, or (ii) inputting each of the 1-st test image to the n-th test image into each of a 1-st object detector to an n-th object detector, wherein the 1-st object detector corresponds to the 1-st camera and the n-th objector corresponds to the n-th camera, to thereby instruct each of the 1-st object detector to the n-th object detector to perform object detection on the 1-st test image to the n-th test image and thus acquire 1-st object detection information to n-th object detection information, wherein the 1-st object detection information contains information on one or more 1-st bounding boxes for one or more 1-st objects positioned in the 1-st test image and information on one or more 1-st projection points acquired by projecting one or more centers of mass of the 1-st objects onto the ground and information on the n-th object detection contains information on one or more n-th bounding boxes for one or more n-th objects positioned in the n-th test image and information on one or more n-th projection points acquired by projecting one or more centers of mass of the n-th objects onto the ground;

(b) the object recognizing device projecting each of the 1-st object detection information to the n-th object detection information onto a top view map for the specific space; and (c) the object recognizing device (i) assigning each of clusters that are different from each other to all of the 1-st projection points included in the 1-st object detection information projected onto the top view map to thereby generate 1-st stage-derived clustering information, (ii) while increasing k from 2 to n, determining whether a specific cluster exists or not, among all clusters included in a (k−1)-th stage-derived clustering information, whose distance from all k-th projection points included in k-th object detection information projected onto the top view map is shortest within a preset distance, to thereby generate a k-th stage-derived clustering information, and (iii) recognizing all clusters included in the n-th stage-derived clustering information as each of objects by referring to n-th stage-derived clustering information.

6. The method of claim 5, wherein, at said (ii) of the step of (c), for a (1_k)-th projection point which is any one among all the k-th projection points, in case a 1_(k−1)-th cluster exists, among all clusters included in the (k−1)-th stage-derived clustering information, whose distance is shortest within the preset distance, the object recognizing device combines the (1_k)-th projection point with the 1_(k−1)-th cluster, and wherein, for a (2_k)-th projection point which is any one among all the k-th projection points, in case the specific cluster does not exist, among all the clusters included in the (k−1)-th stage-derived clustering information, whose distance is shortest within the preset distance, the object recognizing device assigns the (2_k)-th projection point to a new cluster.

7. The method of claim 5, wherein, at the step of (c), the object recognizing device calculates Euclid distance between all clusters included in the (k−1)-th stage-derived clustering information and a specific k-th projection point projected onto the top view map to thereby confirm a closest cluster within the preset distance by using the Euclid distance calculated.

8. The method of claim 5, wherein, at the step of (b), the object recognizing device projects pixels of each of the 1-st test image to the n-th test image onto the top view map through homography transformation, wherein the 1-st test image contains the 1-st object detection information and the n-th test image contains the n-th object detection information.

9. The method of claim 5, wherein the object detector is trained to predict one or more centers of mass of one or more objects projected onto the ground by using a training image by a learning device, and wherein the learning device (i) inputs one or more training images acquired from a training data set into the object detector to thereby instruct the object detector to perform object detection on each of the training images and thus generate each of object detection results for training including information on each of predicted bounding boxes, corresponding to one or more ROIs for training, acquired by predicting each of locations of one or more objects for training in each of the training images and information on each of predicted projection points acquired by projecting each of centers of mass of each of the objects for training onto the ground and (ii) trains the object detector by using each of object detection losses generated by referring to each of the object detection results and information on each of ground truths corresponding to each of the training images.

10. A learning device for training an object detector capable of predicting a center of mass of at least one object projected onto a ground, comprising:

a memory that stores instructions for training the object detector capable of predicting the center of mass of the object projected onto the ground, and a processor configured to train the object detector capable of predicting the center of mass of the object projected onto the ground;

wherein the processor performs: (I) a process of acquiring one or more training images from a training data set; (II) a process of inputting each of the training images into an object detector to thereby instruct the object detector to perform object detection for each of the training images and thus generate each of object detection results including (i) information on each of predicted bounding boxes, corresponding to one or more ROIs, acquired by predicting each of locations of one or more objects in each of the training images and (ii) information on each of predicted projection points acquired by projecting each of centers of mass of each of the objects onto the ground; and (III) a process of training the object detector by using each of object detection losses generated by referring to each of the object detection results and information on each of ground truths corresponding to each of the training images.

11. The learning device of claim 10, wherein, at the process of (III), wherein, in case a 1-st ground truth corresponding to a 1-st training image which is any one of the training images contains information on a 1-st labeled box and information on a 1-st labeled projection point for a 1-st object which is any one object located in the 1-st training image, the processor generates a 1-st bounding box loss by referring to a 1-st predicted bounding box and the 1-st labeled box corresponding to the 1-st object, generates a 1-st projection point loss by referring to a 1-st predicted projection point and the 1-st labeled projection point corresponding to the 1-st object, and trains the object detector by using the 1-st bounding box loss and the 1-st projection point loss, and wherein, in case a 2-nd ground truth corresponding to a 2-nd training image which is any one of the training images contains information on a 2-nd labeled box for a 2-nd object which is any one object located in the 2-nd training image and does not contain information on a 2-nd labeled projection point for the 2-nd object, the processor generates a 2-nd bounding box loss by referring to a 2-nd predicted bounding box and the 2-nd labeled box corresponding to the 2-nd object, generates a 2-nd projection point loss by setting a specific loss related to a 2-nd predicted projection point for the 2-nd object as a preset value, and trains the object detector by using the 2-nd bounding box loss and the 2-nd projection point loss.

12. The learning device of claim 10, wherein, at the process of (II), the processor instructs the object detector to generate each of the object detection results by further including (iii) information on each of predicted object classes acquired by classifying classes of each of the objects corresponding to each of the ROIs, and wherein, at the step of (c), the processor further generates each of object class losses for each of the ROIs by referring to information on each of predicted object classes and information on each of labeled object classes further contained in information on each of the ground truths, and trains the object detector by further using each of the object class losses.

13. The learning device of claim 10, wherein, at the process of (III), in response to a mini batch comprised of a plurality of training images sampled from the training data set, the processor acquires each of object detection results corresponding to each of the plurality of training images by performing the step of (b) for each of the plurality of training images included in the mini batch, generates a mini batch loss by referring to the bounding box losses and the projection point losses corresponding to each of the plurality of training images, and trains the object detector by using the mini batch loss.

14. An object recognizing device for recognizing an identical object in a specific space taken from a plurality of cameras having viewing frustums that are different from each other by using an object detector capable of predicting centers of mass of objects projected onto a ground, comprising:
a memory that stores instructions for recognizing the identical object in the specific space taken from the plurality of cameras having viewing frustums that are different from each other by using the object detector capable of predicting the centers of mass of the objects projected onto the ground; and
a processor for recognizing the identical object in the specific space taken from the plurality of cameras having viewing frustums that are different from each other by using the object detector capable of predicting the centers of mass of the objects projected onto the ground;
wherein the processor performs processes of (I) in response to a 1-st test image to an n-th test image acquired by taking the specific space from a 1-st camera to an n-th camera having viewing frustums that are different from each other, wherein the n is an integer of 2 or more, (i) inputting each of the 1-st test image to the n-th test image into an object detector trained to predict one or more centers of mass of one or more objects projected onto the ground, to thereby instruct the object detector to perform object detection on each of the 1-st test image to the n-th test image, or (ii) inputting each of the 1-st test image to the n-th test image into each of a 1-st object detector to an n-th object detector, wherein the 1-st object detector corresponds to the 1-st camera and the n-th objector corresponds to the n-th camera, to thereby instruct each of the 1-st object detector to the n-th object detector to perform object detection on the 1-st test image to the n-th test image and thus acquire 1-st object detection information to n-th object detection information, wherein the 1-st object detection information contains information on one or more 1-st bounding boxes for one or more 1-st objects positioned in the 1-st test image and information on one or more 1-st projection points acquired by projecting one or more centers of mass of the 1-st objects onto the ground and information on the n-th object detection contains information on one or more n-th bounding boxes for one or more n-th objects positioned in the n-th test image and information on one or more n-th projection points acquired by projecting one or more centers of mass of the n-th objects onto the ground; (II) projecting each of the 1-st object detection information to the n-th object detection information onto a top view map for the specific space; and (III) (i) assigning each of clusters that are different from each other to all of the 1-st projection points included in the 1-st object detection information projected onto the top view map to thereby generate 1-st stage-derived clustering information, (ii) while increasing k from 2 to n, determining whether a specific cluster exists or not, among all clusters included in a (k−1)-th stage-derived clustering information, whose distance from all k-th projection points included in k-th object detection information projected onto the top view map is shortest within a preset distance, to thereby generate a k-th stage-derived clustering information, and (iii) recognizing all clusters included in the n-th stage-derived clustering information as each of objects by referring to n-th stage-derived clustering information.

15. The object recognizing device of claim 14, wherein, at said (ii) of the process of (III), for a (1_k)-th projection point which is any one among all the k-th projection points, in case a 1_(k−1)-th cluster exists, among all clusters included in the (k−1)-th stage-derived clustering information, whose distance is shortest within the preset distance, the processor combines the (1_k)-th projection point with the 1_(k−1)-th cluster, and wherein, for a (2_k)-th projection point which is any one among all the k-th projection points, in case the specific cluster does not exist, among all the clusters included in the (k−1)-th stage-derived clustering information, whose distance is shortest within the preset distance, the processor assigns the (2_k)-th projection point to a new cluster.

16. The object recognizing device of claim 14, wherein, at the process of (III), the processor calculates Euclid distance between all clusters included in the (k−1)-th stage-derived clustering information and a specific k-th projection point projected onto the top view map to thereby confirm a closest cluster within the preset distance by using the Euclid distance calculated.

17. The object recognizing device of claim 14, wherein, at the process of (II), the processor projects pixels of each of the 1-st test image to the n-th test image onto the top view map through homography transformation, wherein the 1-st test image contains the 1-st object detection information and the n-th test image contains the n-th object detection information.

18. The object recognizing device of claim 14, wherein the object detector is trained to predict one or more centers of mass of one or more objects projected onto the ground by using a training image by a learning device, and
wherein the learning device (i) inputs one or more training images acquired from a training data set into the object detector to thereby instruct the object detector to perform object detection on each of the training images and thus generate each of object detection results for training including information on each of predicted bounding boxes, corresponding to one or more ROIs for training, acquired by predicting each of locations of one or more objects for training in each of the training images and information on each of predicted projection points acquired by projecting each of centers of mass of each of the objects for training onto the ground and (ii) trains the object detector by using each of object detection losses generated by referring to each of the object detection results and information on each of ground truths corresponding to each of the training images.

* * * * *